April 1, 1930. W. BARSTOW 1,752,362
RECORDING THERMOMETER
Filed June 8, 1922  2 Sheets-Sheet 1
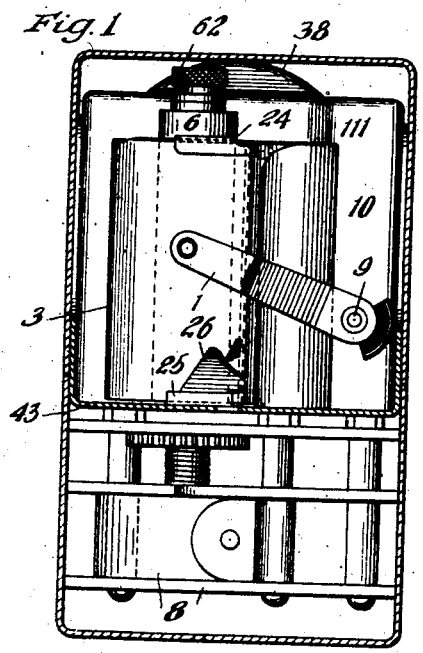
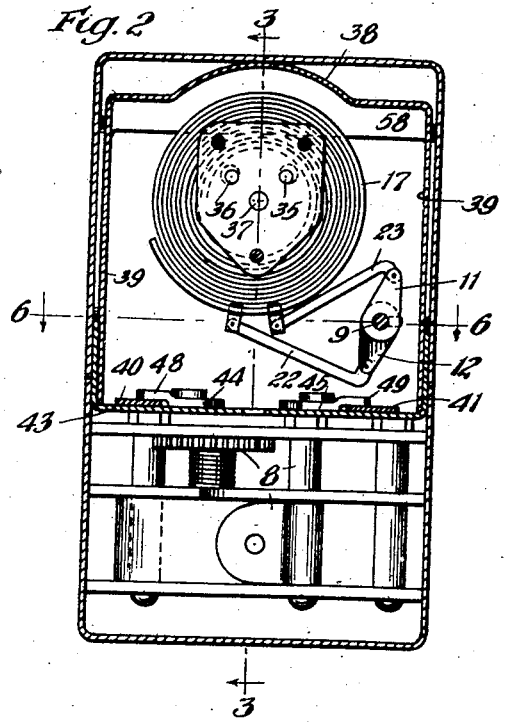
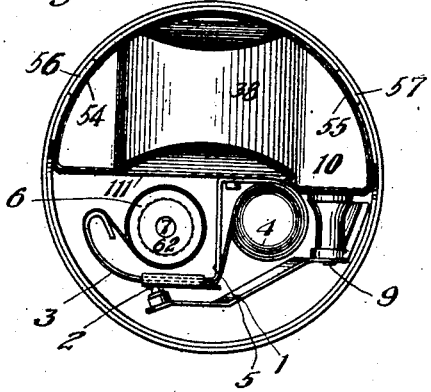
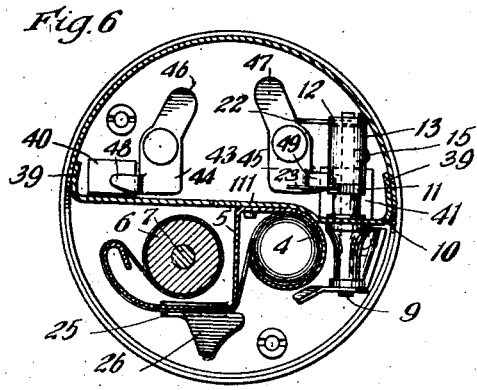
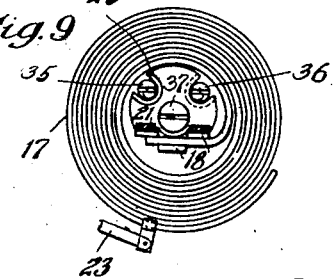
Inventor
Welch Barstow
By Geo. J. Haight
His Atty.

April 1, 1930.                    W. BARSTOW                    1,752,362
                              RECORDING THERMOMETER
                              Filed June 8, 1922              2 Sheets-Sheet 2
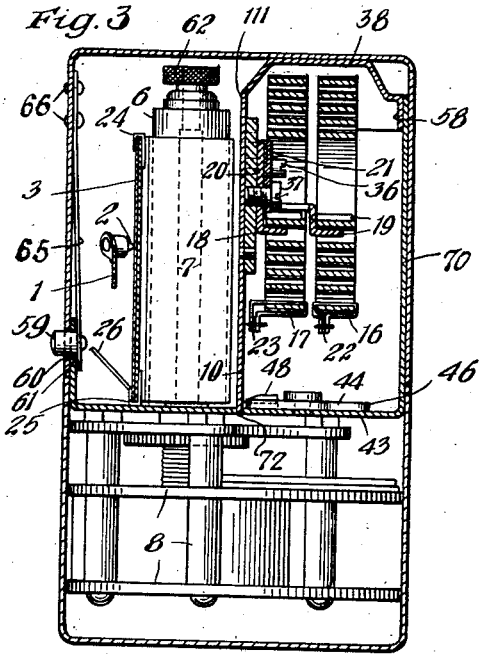
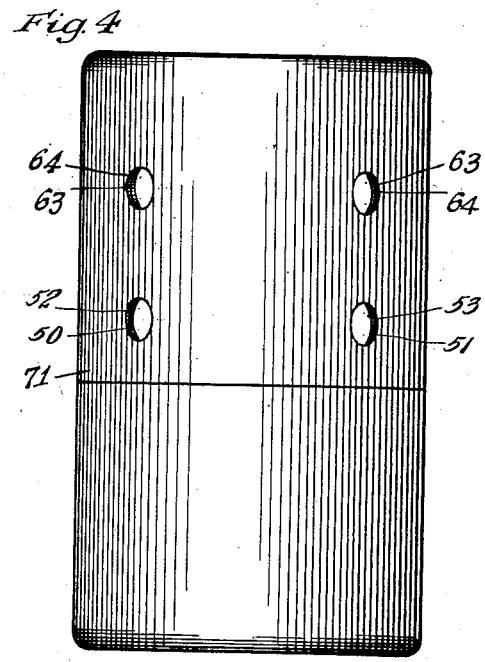
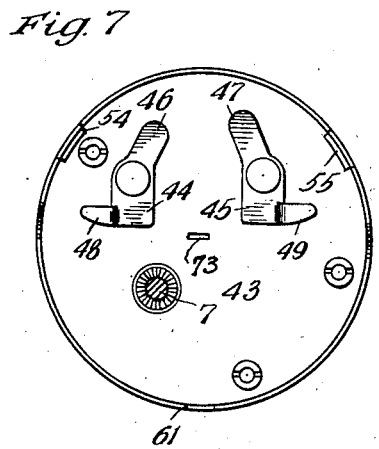
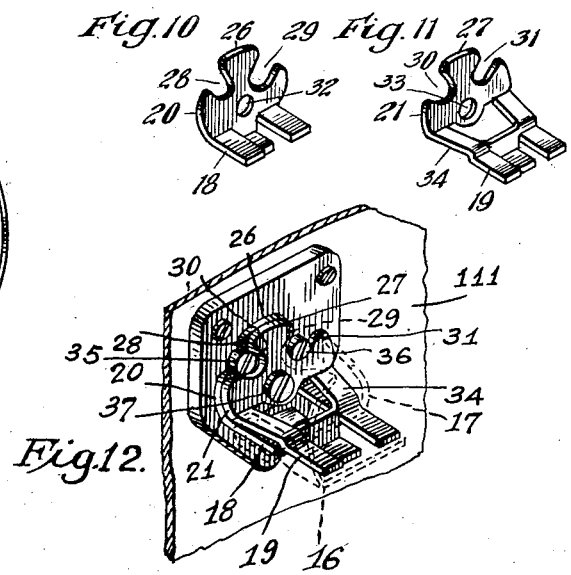
Inventor
Welch Barstow
By Geo. I. Haight
His Atty.

Patented Apr. 1, 1930

1,752,362

UNITED STATES PATENT OFFICE

WELCH BARSTOW, OF LOS ANGELES, CALIFORNIA, ASSIGNOR TO RECORDING THERMOMETER COMPANY, OF LOS ANGELES, CALIFORNIA, A CORPORATION OF WASHINGTON

RECORDING THERMOMETER

Application filed June 8, 1922. Serial No. 566,740.

This invention relates to improvements in recording thermometers, and has particular reference to a recording thermometer which is adapted to be installed in a railway refrigerating car to provide an accurate and continuous record of the temperature at which the car is maintained.

During the transportation of fresh fruits and vegetables from place to place, it is highly important that a uniform temperature be maintained in the refrigerating car, especially when the journey is of prolonged duration, to prevent the contents of the car from being affected by extremes of temperature, ordinarily too high a temperature, with resulting deterioration of the contents and loss to the owners thereof. A device of the character described is essential especially when the question of damages is involved for the reason that should any spoilage occur in the refrigerating car, this recording thermometer provides a convenient, accessible and accurate record of the temperature conditions during the time when the fruits or other commodity were in the custody of the railroad company.

One of the objects of the invention is to provide a recording thermometer which is compact, accurate and so arranged and constructed as to withstand considerable rough handling without danger of injury to any of the parts thereof or of affecting the accuracy of the temperature record contained therein.

A further object of the invention is to combine a sensitive recording thermometer which is capable of accurate calibral adjustment and so constructed as to neutralize vibrations imparted to it by the car while in transit and to eliminate the possibility of such vibrations being transmitted to the stylus and a consequent irregularity in the recording line not entirely due to climatic changes.

A further object of the invention is to provide a recording thermometer which when once assembled, is inaccessible to any unauthorized person to alter the record contained therein.

A further object of the invention is to provide a device of the character described which is capable of minute adjustment to conform with the actual temperature of the car or other inclosing medium at a time when it is desired to commence the continuous temperature record.

The present invention is designed to provide an improvement on prior Patent 1,264,478 dated April 30, 1918, and overcomes several disadvantages which are met with in the structure disclosed in said patent.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood, there are shown in the accompanying drawings, means for carrying the same into practical effect, without limiting the improvements, in their useful applications, to the particular constructions which, for the purpose of explanation, have been made the subject of illustration.

In said drawings, Figure 1 is a central, vertical section through the casing and cover showing the enclosed parts in elevation, the same showing a recording thermometer embodying my invention. Figure 2 is a view similar to Figure 1, the section being through the frame as well as the casing. Figure 3 is a central, vertical section on a plane at right angles to the plane of Figure 1 on line 3—3 of Figure 2 and looking at the front of the coil mechanism. Figure 4 is a side elevation of the casing. Figure 5 is a plan view of the thermometer with the cover removed. Figure 6 is a transverse section on line 6—6 of Figure 2 with the thermostatic coils removed. Figure 7 is a plan view of the thermometer with the cover and frame structure removed. Figure 8 is a rear view of the rear thermostatic coil, the same coiled clockwise as seen in this figure. Figure 9 is a similar view of the front thermostatic coil shown as attached to its supporting bracket, the same being coiled anti-clockwise as seen in said figure. Figures 10 and 11 are detail perspective views of the front and rear supporting brackets for the oppositely coiled thermostatic elements. And Figure 12 is a detailed perspective view of the adjusting means for the thermostatic coils.

Referring to the drawings 1 indicates the marking member or arm provided with a stylus 2 which is adapted to contact with and produce a record line on a recording sheet 3. The sheet 3 is adapted to be fed or advanced from a roll 4 over an upright supporting table 5 to a spool 6 mounted on a spindle 7, which latter communicates with a clockwork mechanism indicated as an entirety by 8. The clockwork mechanism is supported in the lower part of the casing and is of usual or preferred construction and forming no part of the present invention, will not be described in detail. The sheet 3 is held in contact with the table 5 and prevented from transverse movement by upper and lower guide flanges 24 and 25 extending outwardly and upwardly from and integral with the supporting table 5. The lower guide flange 25 is provided with an upwardly extending and outwardly flared lip 26 to facilitate the insertion of the paper when it is desired to start the device in operation.

The marking arm 1 is fixed on one end of a rock shaft 9 pivotally mounted in a frame 10. The other end of the rock shaft 9 is provided with a pair of oppositely extending crank arms 11 and 12 which are fixed on a combined sleeve and spacer 13. The sleeve 13 is fixed to the shaft by a pin 15 providing a unitary structure mounted for pivotal or oscillatory movement on the rock shaft. 16 and 17 indicate a pair of oppositely coiled spiral thermostatic elements of any usual or preferred construction and comprising coils of bi-metallic material one of which, preferably brass, has a high coefficient of expansion and the other of which, preferably an alloy of nickel and steel, has a coefficient of expansion which is practicably negligible.

The coils 16 and 17 are mounted adjacent one another and are supported at their inner ends by arms or fingers 18 and 19 projecting at right angles from front and rear brackets 20, 21, which are nested one within the other adjustably secured to the vertical wall 111 of the frame 10 by a screw or pin 37 passing through the apertures 32 and 33. The outer end of the coil 16 is pivotally secured by a link 22 to the lower end of the outer depending crank arm 12; and the outer extremity of the coil 17 is similarly connected by a link 23 to the upwardly diametrically extending crank arm 11.

From the foregoing it will be observed that when the coils 16 and 17 are affected by temperature changes, the resulting expansion or contraction of the same is communicated to the rock shaft 9 through the links 22 and 23 rocking on the shaft and marking arm 1 with the result that such variations are recorded by the stylus 2 on the sheet 3. At the same time, due to the construction described, any sudden vibration or shock to which the coils 16 and 17 may be subjected during transit is neutralized by the fact that they are oppositely coiled and the tendency of one coil to suddenly move its link and crank arm in one direction is counteracted by a similar tendency of the other coil caused by the same vibration to move in the opposite direction, with the result that said vibration is prevented from being transmitted to the marking arm 1 and stylus 2 and irregularity in the record line due to such vibrations is thereby eliminated. Shocks in directions lateral to the coils have little tendency to move the indicator but such shocks also are neutralized by the opposing coils as to any effect on the stylus.

The brackets 20, 21 are each provided with vertically extending walls 26, 27 which are cut away or apertured in the bracket 20 as indicated at 28 and 29 and in the bracket 21 as indicated at 30 and 31. The apertures 28 and 31 are formed of the same size but are on opposite sides of the vertical walls, and the apertures 29 and 30 are also of equal size but larger than the apertures 28 and 31 and are on opposite sides of the upright walls. As best seen in Figures 3, 9, 10 and 11 the rear bracket 21 is nested over the front bracket 20 so that the apertures 32, 33 coincide and the outwardly extending supporting arms or fingers 18 to which one end of the front coil 17 is fixed, are nested within the recess 34 in the rear bracket 21 to the fingers 19 of which is fixed the inner end of the outer coil 16. When it is desired to adjust the stylus on the record sheet irrespective of temperature conditions such as when it is desired to start the device in operation, the construction above described affords a means of obtaining the desired adjustment. As best seen in Figure 12 eccentric pins 35 and 36 are mounted in the frame 10 with their heads resting in the alined apertures above described of the nesting brackets 20 and 21. The heads of the eccentric pins 35 and 36 are recessed to permit their rotation by a screw driver and it will be observed that by first loosening the screw 37 either eccentric may be turned. The rotation of the eccentric 36 due to the difference in size of the apertures 29 and 31 results in the rocking of the rear bracket 21 on its pivot with the consequent shifting of the rear coil 16. A similar rotation of the eccentric 35 results in the rotation of the front bracket 20 on its pivot and consequent change in position of the front coil 17. When the desired adjustment has been obtained, the screw 37 is tightened, securely clamping the parts in position with the stylus in the desired position on the record sheet. It will be observed that the above described construction provides an accurate and permanent means of adjustment of either or both of the spiral coils 16 and 17.

The frame 10 to which the coils 16 and 17 are fixed, is provided with a semi-circular horizontally disposed cover 38 which serves to protect the coils and render them inaccessible when the device is assembled. The vertical wall 111 is provided with inturned side flanges 39 and lower horizontal inturned lugs or flanges 40, 41 which latter, when the device is assembled, rest on the intermediate bottom 43 of the casing 70 (Figures 2 and 6). At the lower extremity of the wall 111, a downwardly projecting, vertically disposed, integral lug 72 is also provided adapted to engage in an opening 73 in the bottom wall portion 43, thereby preventing lateral movement of the frame. A pair of locking levers 44 and 45 are pivotally mounted on the bottom portion 43 and are provided with operating arms 46 and 47 at one end and upwardly extending flared lip portions 48, 49 at their other ends which are adapted to be swung into engagement overlapping the lugs 40, 41 of the frame 10. Access to the levers 44 and 45 to lock or unlock the frame within the casing by swinging the lips 48, 49 to or from engagement with the lugs 40 and 41 is obtained by a specially constructed key (not shown) which is inserted through apertures 50, 51 in the casing 70 and similar coinciding apertures 52 and 53 in the casing cover 71. Further means to lock the upper end of the frame to the casing, in all respects similar to the locking means illustrated in my prior Patent 1,264,478 is provided, the same being in the nature of a pair of inturned flanges 54 and 55 on the upper wall of the casing 70 adapted to be engaged within a pair of recesses 56, 57 on a downturned upper flange 58 of the cover portion 38 of the frame structure. By the above it will be observed that when the device is assembled by inserting the frame 10 within the casing and the locking levers have been swung into position over the lugs 40 and 41 it will be impossible for any unauthorized person to remove the frame and obtain access to the thermostatic coils housed therein.

The alined apertures 50, 51, 52, 53 in the casing and cover, as well as similarly alined apertures 63 and 64, permit the access and free circulation of air to the casing in contact with the thermostatic coils. A locking arrangement for the cover on the casing is provided in the shape of a leaf spring 65 riveted or otherwise secured as at 66 to the cover and having at its lower end a knob or projection 59 which protrudes from alined apertures 60 and 61 in the cover and casing, and the cover may be removed by depressing the projection 59, as will be readily understood. Means for winding the clockwork mechanism and removing the coil of recording paper from the spool is afforded by a knurled knob 62 on the end of the spindle or shaft 7.

I claim:

1. In a thermometer, the combination with a movable temperature indicating member; of two elements expansible by heat, each element comprising a coil including a plurality of convolutions, said coils being bodily wound and concentric, and each element being fixedly mounted at one end and both of said expansible elements having their free ends connected with said indicating member to actuate the latter in the same direction.

2. In a thermometer, the combination with a temperature indicating member, said element being movable in two directions; of two oppositely coiled expansible elements, each element consisting of a plurality of convolutions being fixedly mounted at one end and both of said expansible elements having their free ends connected with said indicating member to simultaneously actuate the latter in the same direction.

3. In a recording thermometer having an indicator, means for actuating said indicator in accordance with thermal changes and including, two thermostatic coils, each of spiral formation, the coils being oppositely coiled arranged in parallel planes and having a common axis, a shaft extending parallel to the axes of the thermostatic coils, and connections between the free ends of said coils and the opposite sides of the shaft to thereby neutralize vibratory effects, otherwise transmissible to an indicator.

4. In adjusting means for thermostatic units, the combination with a coil having a free end adapted to be connected to an indicating element; of means for securing the opposite end of said coil in different positions of adjustment, said means including a bracket element secured to said opposite end of said coil, said bracket being mounted for rotation and adapted to be secured in fixed position, and eccentric elements co-operating with said bracket to rotate the same to obtain adjustment of the movement of the free end of said coil.

5. In adjusting means for thermostatic units, the combination with oppositely wound coils having their free ends adapted to be connected to an indicating element; of means for securing the opposite ends of said coils, said means including nested brackets each secured to the opposite end of one of said coils, said brackets being rotatably adjustable with respect to each other to vary the movement of the free ends of the coils.

6. In adjusting means for thermostatic units, the combination with a coil having a free end, and the opposite end of said coil adapted to be fixed; of means for adjustably fixing said opposite end of the coil, said means including a bracket and eccentric means for shifting the bracket to vary the position of said opposite end of said coil.

7. In adjusting means for thermostatic units, the combination with a pair of oppositely disposed coils; of means for securing the inner ends of said coils in different positions of adjustment said means including relatively movable brackets for varying the positions of the inner ends of said coils, and eccentric means for shifting the positions of said brackets to effect adjustment of the movement of said coils.

8. In adjusting means for thermostatic units, the combination with a plurality of oppositely disposed coils; of means for adjustably securing the inner ends of said coils, said means including elements shiftable with respect to each other and adapted to adjust the positions of the free ends of said coils.

9. Temperature responsive means in the form of oppositely wound thermostatic elements, each of which consists of a plurality of convolutions, each element being fixedly mounted at one end and both of said elements having their free ends connected for movement in the same direction.

10. In a recording mechanism for a refrigerator car, comprising, in combination; a recording sheet and means for moving said sheet in predetermined fashion; a stylus for marking said sheet during its movement; and thermostatic means for controlling the movements of said stylus depending upon changes in temperature, said thermostatic means being in the form of oppositely wound thermostatic elements having their inner ends fixed in position; and means connecting the free ends of said elements with said stylus whereby both of said elements operate to move the stylus in the same direction and serve to counterbalance each other and prevent transmission of vibrations incident to operation of said car to said stylus.

In witness that I claim the foregoing I have hereunto subscribed my name this 6th day of May, 1922.

WELCH BARSTOW.